(12) United States Patent
Wana

(10) Patent No.: US 6,326,953 B1
(45) Date of Patent: *Dec. 4, 2001

(54) METHOD FOR CONVERTING TEXT CORRESPONDING TO ONE KEYBOARD MODE TO TEXT CORRESPONDING TO ANOTHER KEYBOARD MODE

(75) Inventor: John Surapunt Wana, Seattle, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,784

(22) Filed: Jun. 24, 1998

(51) Int. Cl.[7] .................................................... G09G 5/00
(52) U.S. Cl. ............................ 345/168; 345/171; 345/173
(58) Field of Search .................................. 345/168, 171, 345/173; 341/22, 23; 400/484; 704/2, 3, 8, 4, 5, 6, 7, 9, 10

(56) References Cited

U.S. PATENT DOCUMENTS

| 4,130,882 | * | 12/1978 | Swanstrom et al. | 364/900 |
| 5,634,134 | * | 5/1997 | Kumai et al. | 395/798 |
| 5,751,957 | * | 5/1998 | Hiroya et al. | 395/200.33 |
| 5,754,847 | * | 5/1998 | Kaplan et al. | 395/611 |
| 5,787,386 | * | 7/1998 | Kaplan et al. | 704/8 |

* cited by examiner

Primary Examiner—Richard Hjerpe
Assistant Examiner—Jean Lesperance
(74) Attorney, Agent, or Firm—Merchant & Gould

(57) ABSTRACT

Converting text corresponding to one keyboard mode to text corresponding to another keyboard mode. Language detection is used to determine whether text was entered using the correct keyboard mode. If the text was entered using an incorrect keyboard mode, then the text is automatically converted to text that corresponds to the correct keyboard mode. The incorrect text is converted on a character by character basis to the correct text by mapping each incorrect character to a virtual key and then mapping the virtual key to the correct character.

18 Claims, 8 Drawing Sheets

This is not Greek

FIG. 7B

METHOD FOR CONVERTING TEXT CORRESPONDING TO ONE KEYBOARD MODE TO TEXT CORRESPONDING TO ANOTHER KEYBOARD MODE

FIELD OF THE INVENTION

This invention relates in general to converting text from one character set to an alternative character set, and more particularly to converting text entered using one keyboard mode to text corresponding to an alternative keyboard mode.

BACKGROUND OF THE INVENTION

Word processing programs are commonly used to create and edit documents. To create a document using a word processing program, an author typically enters the text of the document using a keyboard. A single keyboard can support multiple character sets so that the author can use a single keyboard to enter different types of characters. For example, the author can use one keyboard to enter both Latin characters and Greek characters. A different keyboard mode is used for each character set. To enter Latin characters, the user selects the Latin keyboard mode by depressing a combination of keys or by selecting an icon corresponding to the Latin keyboard mode. To enter Greek characters, the user selects the Greek keyboard mode by depressing a combination of keystrokes or by selecting an icon that corresponds to the Greek keyboard mode.

The author can switch between keyboard modes so that the author can create a document using Greek characters and then create a document using Latin characters or create a document that uses both Greek characters and Latin characters. There may be times when the author begins entering text assuming that the keyboard is in the Latin keyboard mode, but the keyboard is actually in the Greek keyboard mode. If so, then the text displayed to the author is not what the author intended to enter. To correct the text, the author must either re-enter the text or convert the text. Re-entering the text can be time consuming, especially if the author has entered a substantial amount of text before noticing that the keyboard mode used to enter the text was incorrect. Although converting the text can be less time consuming, converting the text typically requires that the author manually initiate the conversion.

One solution to the keyboard mode problem uses a conversion table to convert the text entered using the incorrect keyboard mode. For example, the "WORD 97" word processing program marketed by Microsoft Corporation of Redmond, Wash. uses a conversion table. The table includes entries that map the characters of one character set to characters of another character set. For example, if the table is used to map Latin characters to Greek characters, then the table includes entries that map Latin characters to Greek characters. A Latin character entered using a particular key on the keyboard is mapped to a Greek character that corresponds to the same key. The author highlights the text that was entered using the incorrect keyboard mode and then initiates the conversion of the text by depressing a combination of keys. The text is converted by looking up each character and then mapping the character to the alternative character listed in the conversion table.

One drawback of the "WORD 97" solution is that it is inflexible. Conversion is only possible if there is an applicable conversion table. In addition, if there is no entry in the conversion table for a character, then the character cannot be converted. Another drawback is that the conversion table requires a substantial amount of computer memory.

If there are more than two keyboard modes available to the user, then a table is required for each conversion. For example, if a single keyboard can be used to enter Latin characters, Greek characters and Cyrillic characters, then multiple tables are needed to support Latin to Greek conversion, Latin to Cyrillic conversion, Greek to Cyrillic conversion, and the corresponding reverse conversions. Yet another drawback is that the author must identify the text that was entered using the incorrect keyboard mode and then manually initiate the conversion.

Accordingly, there is a need in the art for a flexible method for automatically converting text entered using one keyboard mode to text corresponding to another keyboard mode.

SUMMARY OF THE INVENTION

The present invention meets the needs described above by providing a method for automatically converting text from one character set to an alternative character set. The method can be used to convert text entered using one keyboard mode to text corresponding to an alternative keyboard mode. The method uses language detection to determine whether text was entered using the correct keyboard mode. If the text was entered using an incorrect keyboard mode, then the text is converted to text that corresponds to the correct keyboard mode. The incorrect text is converted on a character by character basis to the correct text by mapping each incorrect character to a virtual key and then mapping the virtual key to the correct character.

An exemplary software architecture for an embodiment of the present invention includes an application program, such as a word processing program, an operating system, a first keyboard driver, a second keyboard driver, a language detection module, and a text converter module. The keyboard drivers convert scan codes received from the keyboard to operating system messages that identify the characters or functions associated with the keystrokes. Each keyboard driver corresponds to a different keyboard configuration. For example, a first keyboard driver could correspond to a configuration for the Latin character set and a second keyboard driver could correspond to a configuration for the Greek character set.

The text converter module monitors the word processing program to determine when the word processing program is idle. Once the word processing program is idle, then the text converter module determines whether text entered via the word processing program was entered using the correct keyboard mode. To determine whether the text was entered using the correct keyboard mode, the text is sent to the language detection module. The language detection module uses algorithms and statistics to identify the language of the text sample. If the language detection module determines that the text was entered using an incorrect keyboard mode, then the text converter module sends the text, character by character, to the first keyboard driver. The first keyboard driver identifies the virtual key and the keyboard state information that corresponds to each character. A virtual key is a device independent code that identifies the character or function associated with a keystroke. The keyboard state information includes the state of the "shift", "control" and "alt" keys for the keystroke. Once the text converter module receives the virtual key and the keyboard state information from the first keyboard driver, then the text converter module sends the virtual key and the keyboard state information to the second keyboard driver. The second keyboard driver identifies an alternative character that corresponds to the virtual key and the keyboard state information. The text converter module then replaces the characters with the alternative characters.

In one aspect of the invention, the text is converted on a sentence by sentence basis. The text converter module monitors the word processing program to determine when the word processing program is idle. Once the word processing program is idle, then the text entered via the word processing program is reviewed to determine whether the text constitutes a sentence. If so, then the language detection module is used to determine whether the sentence was entered using the correct keyboard mode. If the sentence was not entered using the correct keyboard mode, then a character of the sentence is selected and an alternative character is determined. Once the alternative character is determined, then the selected character is replaced by the alternative character. These steps are repeated until all of the characters of the sentence have been selected.

To determine the alternative character, the text converter module sends the selected character to the keyboard driver associated with the keyboard mode used to enter the sentence. The keyboard driver determines the virtual key and the keyboard state information that corresponds to the selected character and sends the virtual key and the keyboard state information to the text converter module. The text converter module receives the virtual key and the keyboard state information and sends the virtual key and the keyboard state information to the alternative keyboard driver. The alternative keyboard driver converts the virtual key and the keyboard state information to an alternative character.

In another aspect of the invention, the text is converted on a word by word basis. This aspect is similar to the one described above, except that once it has been determined that the sentence was entered using an incorrect keyboard mode, then a word is selected from the sentence and a determination is made as to whether the word is correctly spelled. If the word is correctly spelled, then the word is left alone. If the word is incorrectly spelled, then the word is converted.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 7A and 7B illustrate the conversion of text corresponding to one keyboard mode to text corresponding to an alternative keyboard mode, in accordance with an embodiment of the present invention.

DETAILED DESCRIPTION

The present invention is directed to a method for converting text entered using one keyboard mode to text corresponding to an alternative keyboard mode. In one embodiment, the invention is incorporated into the "WORD" word processing application program marketed by Microsoft Corporation of Redmond, Wash. Briefly described, the method automatically converts text from one character set to an alternative character set so that text entered using an incorrect keyboard mode is automatically converted to text corresponding to the correct keyboard mode. The method uses language detection to determine whether text was entered using the correct keyboard mode. If the text was entered using an incorrect keyboard mode, then the text is converted to text that corresponds to the correct keyboard mode. The incorrect text is converted on a character by character basis to the correct text by mapping each incorrect character to a virtual key and then mapping the virtual key to the correct character.

Exemplary Operating Environment

Figure 1:
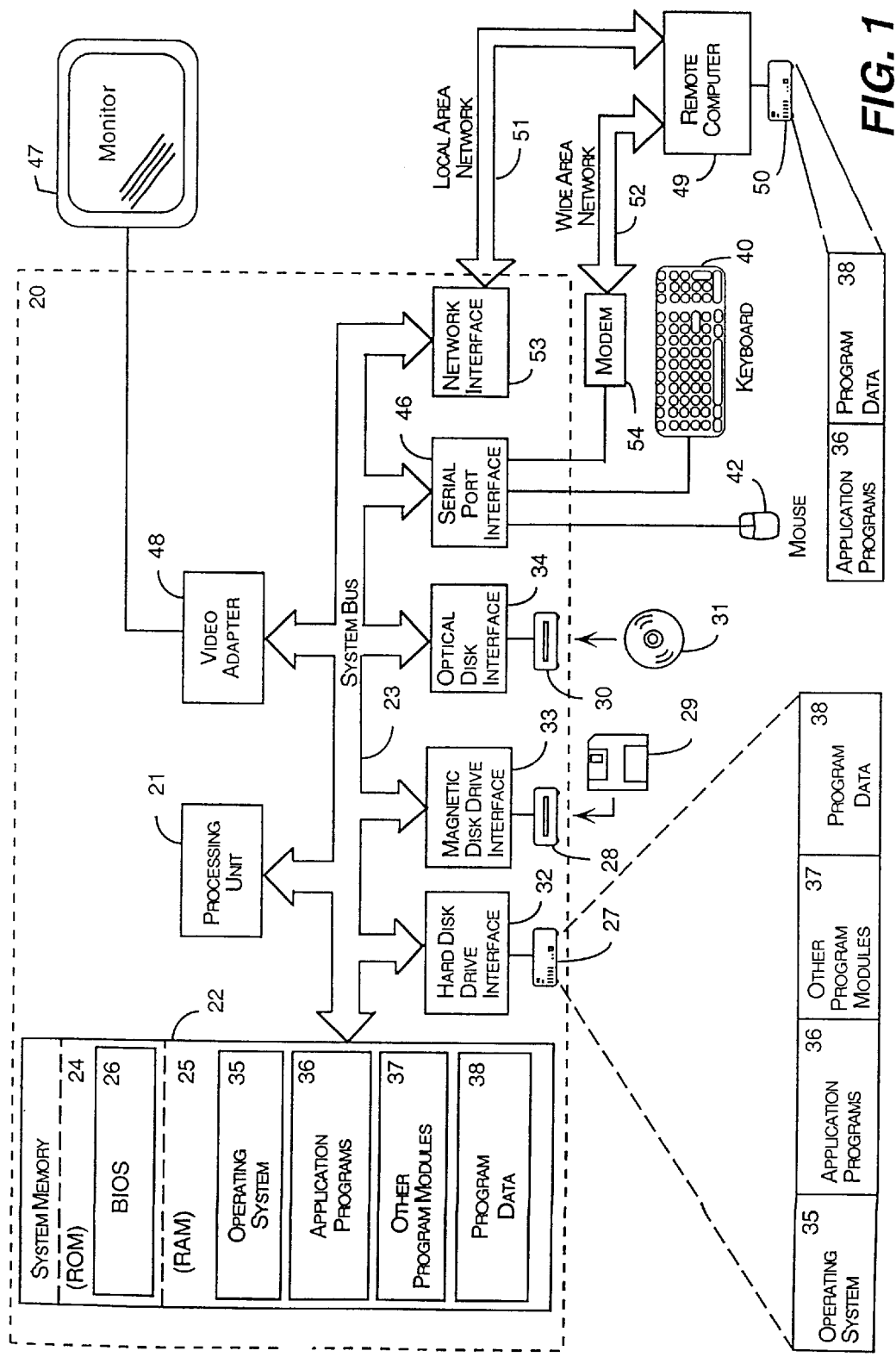
FIG. 1 is a block diagram of a personal computer illustrating an exemplary operating environment for an embodiment of the present invention.

FIG. 1 and the following discussion are intended to provide a brief, general description of a suitable computing environment in which the present invention may be implemented. Although not required, the invention will be described in the general context of computer-executable instructions, such as a program module or file, running on a personal computer. Generally, program modules include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory ("ROM") 24 and random access memory ("RAM") 25. A basic input/output system 26 ("BIOS"), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus ("USB"). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network ("LAN") 51 and a wide area network ("WAN") 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Software Architecture

Figure 2:
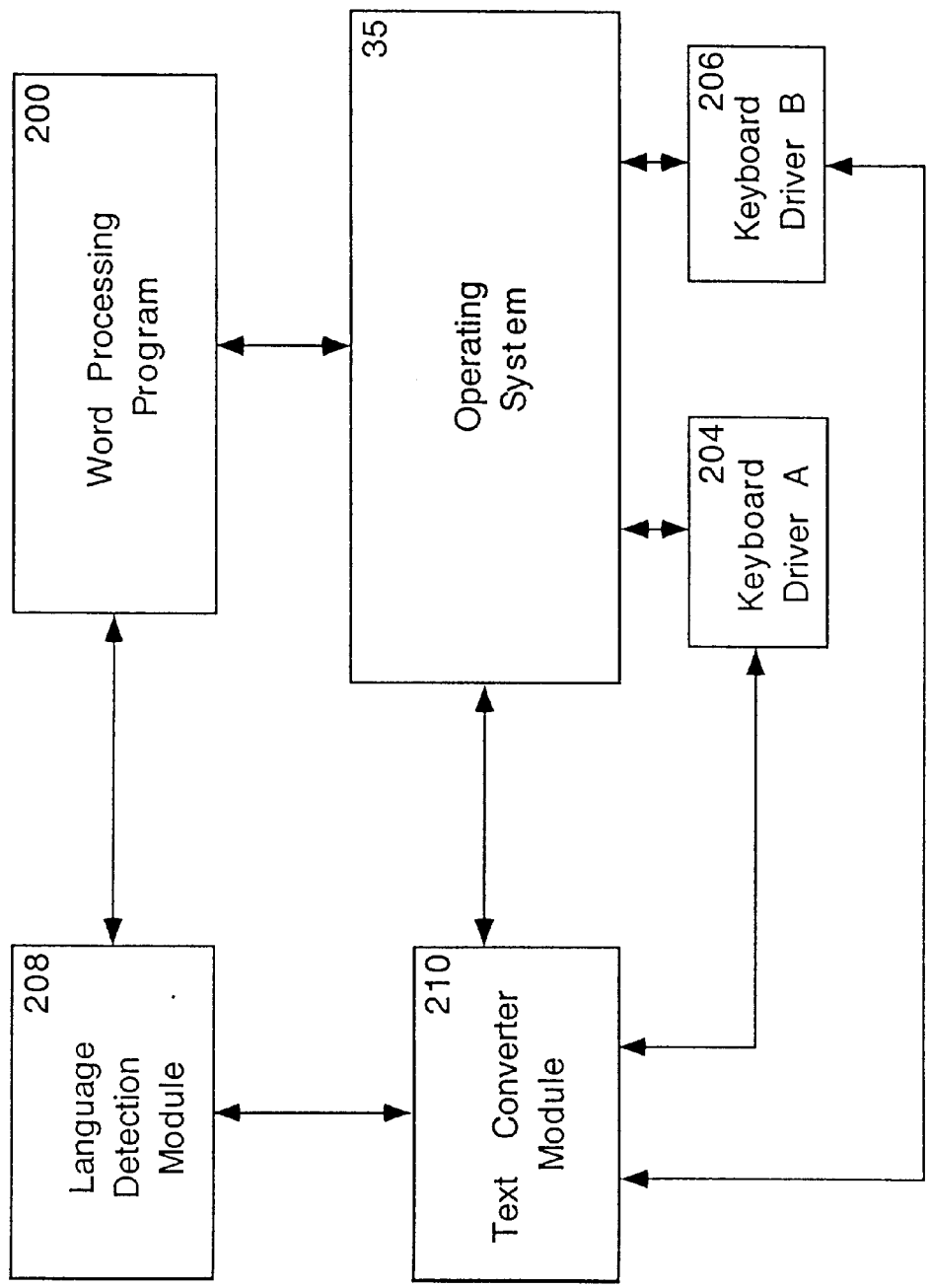
FIG. 2 is a block diagram illustrating an exemplary software architecture for an embodiment of the present invention.

FIG. 2 is a block diagram illustrating an exemplary software architecture for an embodiment of the present invention. The components illustrated in FIG. 2 include an application program, such as a word processing program 200, an operating system 35, keyboard driver A 204, keyboard driver B 206, a language detection module 208, and a text converter module 210. Although the word processing program 200, the language detection module 208, and the text converter module 210 are shown as separate components, those skilled in the art will appreciate that some or all of these components could be combined. Keyboard driver A 204 and keyboard driver B 206 convert scan codes received from the keyboard to operating system messages that identify the characters or functions associated with the keystrokes. Keyboard driver A 204 and keyboard driver B 206 each correspond to different keyboard configurations. For example, keyboard driver A 204 could correspond to a configuration for the Latin character set and keyboard driver B 206 could correspond to a configuration for the Greek character set.

The language detection module 208 determines the language of a text sample. The language detection module typically uses algorithms and statistics to identify the language of the text sample. Additional information on an exemplary language detection module is provided in the commonly assigned U.S. patent application Ser. No. 09/044,752, entitled "System and Method for Identifying the Language of Written Text," filed Mar. 29, 1998, which is incorporated herein by reference. Those skilled in the art will appreciate that other methods of language detection are also possible.

The text converter module 210 interfaces with the word processing program 200, the operating system 35, keyboard driver A 204, keyboard driver B 206, and the language detection module 208. The text converter module 210 monitors the word processing program 200 to determine when the word processing program is idle. Once the word processing program 200 is idle, then the text converter module 210 determines whether text entered via the word processing program 200 was entered using the correct keyboard mode. To determine whether the text was entered using the correct keyboard mode, the text is sent to the language detection module 208. If the language detection module 208 determines that the text was entered using the incorrect keyboard mode, then the text converter 210 communicates with keyboard driver A 204 and keyboard driver B 206 to convert the text to text corresponding to the correct keyboard mode.

The text converter module 210 is used to convert text entered using one keyboard mode to text corresponding to an alternative keyboard mode. In one embodiment, the invention is used to convert Latin characters to Greek characters and vice versa. Latin characters are used in conjunction with the English, French and German languages and Greek characters are used in conjunction with the Greek language. In another embodiment, the invention is used to convert Latin characters to Cyrillic characters and vice versa. Cyrillic characters are used in conjunction with the Russian language. In this embodiment, a user could create a document that includes both Latin characters and Cyrillic characters. To enter Latin characters, the user activates the Latin keyboard mode. To enter Cyrillic characters, the user activates the Cyrillic keyboard mode. However, if the user forgets to switch keyboard modes, before entering text, then the text is entered using the incorrect keyboard mode. The present invention automatically converts the text entered using the incorrect keyboard mode to text corresponding to the correct keyboard mode.

Method for Converting Text Sentence by Sentence

Figure 3:
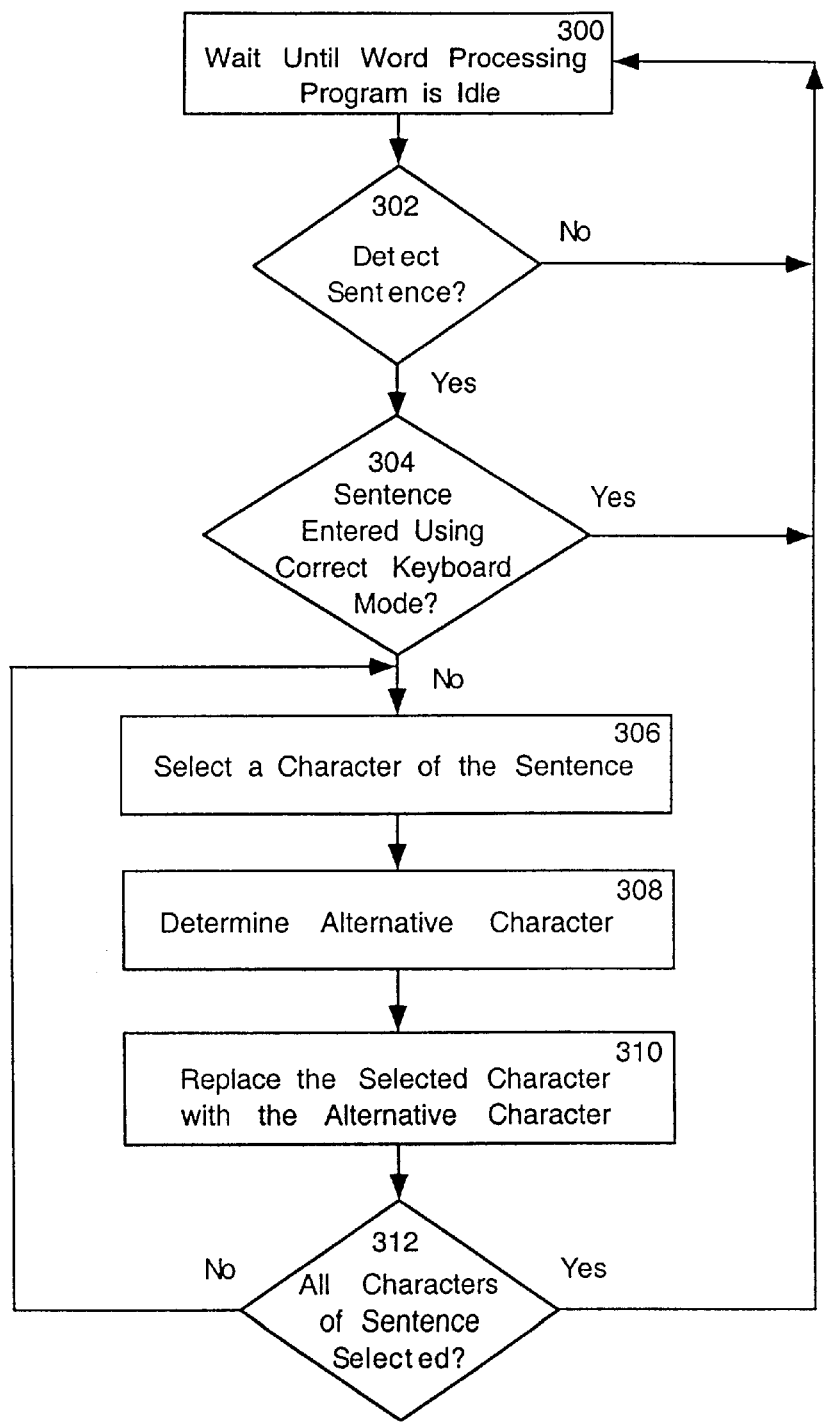
FIG. 3 is a flow diagram illustrating the steps for converting text corresponding to one keyboard mode to text corresponding to an alternative keyboard mode, in accordance with an embodiment of the present invention.

FIG. 3 illustrates the steps for converting text corresponding to one keyboard mode to text corresponding to an alternative keyboard mode on a sentence by sentence basis. Typically, the steps shown in FIG. 3 are performed by the text converter module 210 of FIG. 2. In step 300, the text converter module monitors the word processing program to determine when the word processing program is idle. Once the word processing program is idle, then the method proceeds from step 300 to step 302. In step 302, text entered via the word processing program is reviewed to determine whether the text constitutes a sentence. Preferably, the text converter module looks for a newly entered sentence, as well as an existing sentence that has been edited by adding, deleting or replacing a character of the sentence.

Alternatively, the text converter module could look for any change to a sentence, including a formatting change. To determine whether the text constitutes a sentence, the text converter module searches the text for a delimiter, such as a period or a question mark. If a delimiter is detected, then the determination in step 302 is that a sentence is detected and the Yes branch is followed to step 304. If a delimiter is not detected, then the determination in step 302 is that a sentence is not detected and the No branch is followed to step 300.

If a sentence is detected, then a determination is made as to whether the sentence was entered using the correct keyboard mode in step 304. The text converter module 210 utilizes the language detection module to determine whether the sentence was entered using the correct keyboard mode. Additional details of step 304 are discussed below in connection with FIG. 4. If the sentence was entered using the correct keyboard mode, then the Yes branch is followed to step 300. However, if the sentence was entered using an incorrect keyboard mode, then the No branch is followed to step 306. In step 306, a character of the sentence is selected. Once a character is selected, then the alternative character is determined in step 308. Additional details of step 308 are discussed below in connection with FIG. 5. Once the alternative character is determined, then the selected character is replaced by the alternative character in step 310. In step 312, a determination is made as to whether all of the characters of the sentence have been selected. If so, then the Yes branch is followed to step 300. Otherwise, the No branch is followed to step 306 and steps 306, 308, and 310 are repeated until all of the characters of the sentence have been selected.

Figure 4:
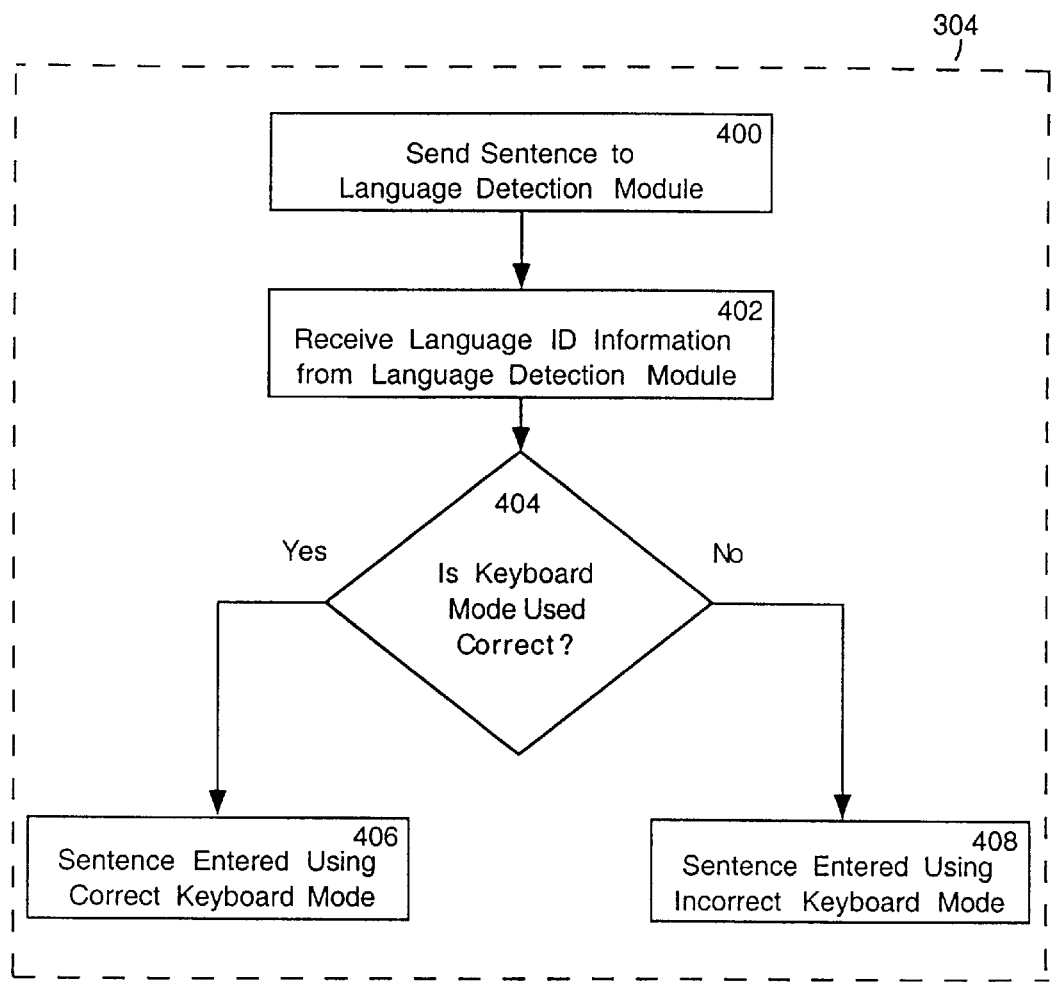
FIG. 4 is a flow diagram illustrating the steps for determining whether the correct keyboard mode was used to enter text, in accordance with an embodiment of the present invention.

FIG. 4 illustrates the steps for determining whether a sentence was entered using the correct keyboard mode. In step 400, the text converter module sends the sentence to the language detection module to determine whether the sentence was entered using the correct keyboard mode. The language detection module scans the sentence and identifies the language of the sentence. In addition, the language detection module performs additional sentence detection to that performed by the text converter module. Once the language detection module has determined the correct language, then the language detection module sends language ID information to the text converter module. Preferably, the language ID information includes (1) the text of the sentence, as determined by the language detection module, (2) the keyboard mode used to enter the sentence, and (3) the keyboard mode that should have been used to enter the sentence. The language ID information is received by the text converter module in step 402. If the keyboard mode used to enter the sentence is different than the keyboard mode that should have been used to enter the sentence, then the determination in step 404 is that the sentence was entered using the incorrect keyboard mode and the No branch is followed to step 408. If the determination in step 404 is that the correct keyboard mode was used, then the Yes branch is followed to step 406.

Figure 5:
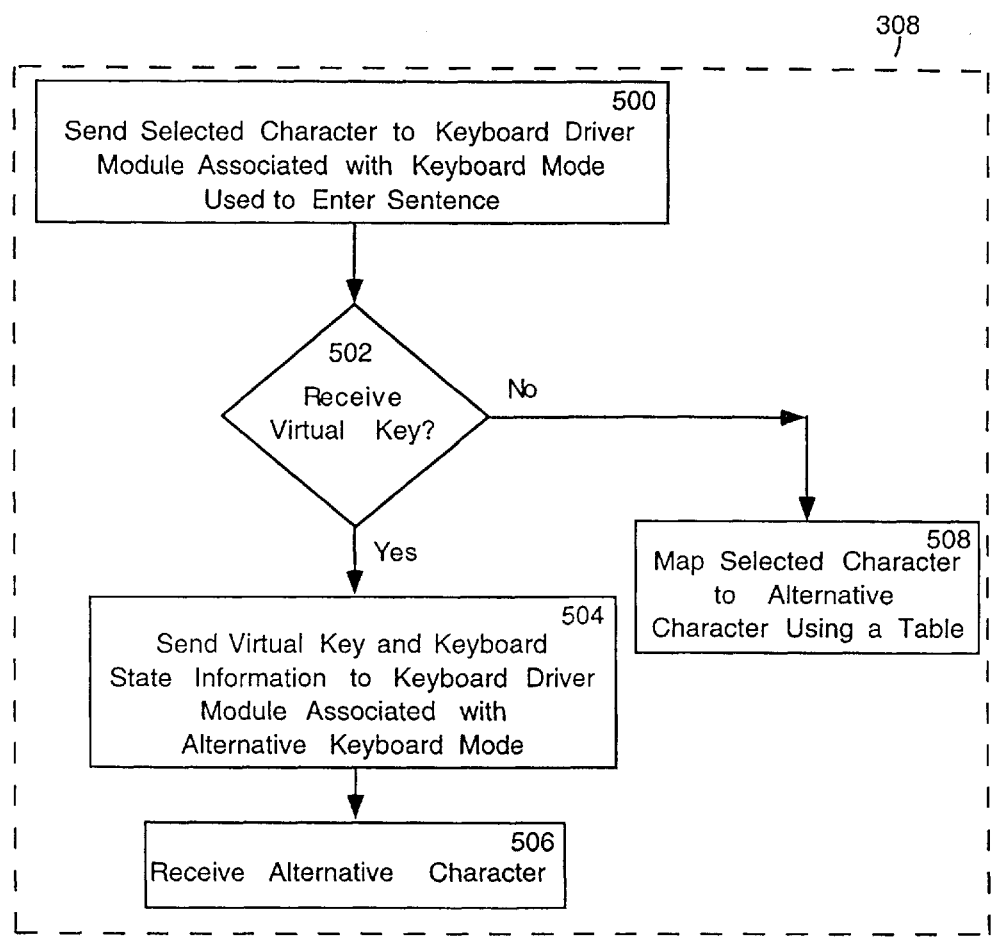
FIG. 5 is a flow diagram illustrating the steps for determining the alternative character, in accordance with an embodiment of the present invention.

FIG. 5 illustrates the steps for determining the alternative character. In step 500, the text converter module sends the selected character to the keyboard driver associated with the keyboard mode used to enter the sentence. For example, if keyboard driver A was the active keyboard driver when the user entered the sentence, then the selected character is sent to keyboard driver A. The keyboard driver converts the selected character to a virtual key and determines the keyboard state information associated with the character. The keyboard state information includes the state of the "shift", "control" and "alt" keys for the character. The virtual key is a device independent code that is defined by an operating system, such as the "WINDOWS" operating system, and that identifies the character or the function that corresponds to the keystroke. There are some keys that cannot be mapped to a virtual key. For example, keys used to add a diacritic to a character produced by a subsequent keystroke cannot be mapped to a virtual key. If the keyboard driver can map the selected character to a virtual key, then the text converter module receives the virtual key and the keyboard state information in step 502 and the Yes branch is followed to step 504. In step 504, the text converter module sends the virtual key and the keyboard state information to the alternative keyboard driver. In this example, the text converter module sends the virtual key and the keyboard state information to keyboard driver B. Keyboard driver B converts the virtual key and the keyboard state information to an alternative character and the alternative character is received by the text converter module in step 506.

If the keyboard driver module cannot map the selected character to a virtual key, then the No branch is followed from step 502 to step 508. In step 508, the text converter module uses an exception table to map the selected character to an alternative character. If the selected character is not listed in the exception table, then the text converter module does not replace the selected character. Because the exception table only handles characters that cannot be mapped to a virtual key, the table is smaller than the prior art tables which were used to convert all the characters of a character set.

Method for Converting Text Word by Word

Figure 6A:
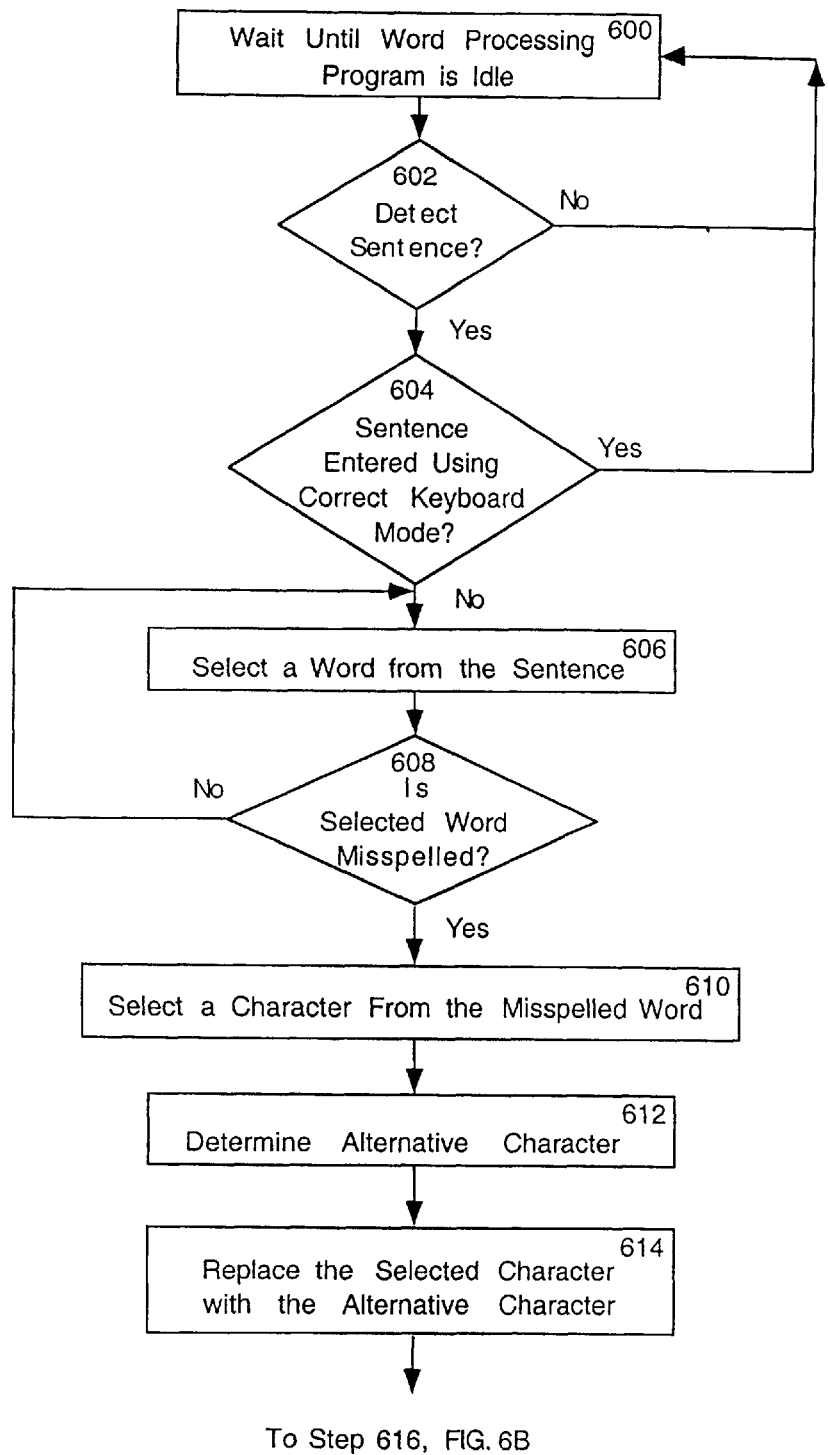
FIGS. 6A and 6B are flow diagrams illustrating the steps for converting text corresponding to one keyboard mode to text corresponding to an alternative keyboard mode, in accordance with another embodiment of the present invention.
Figure 6B:
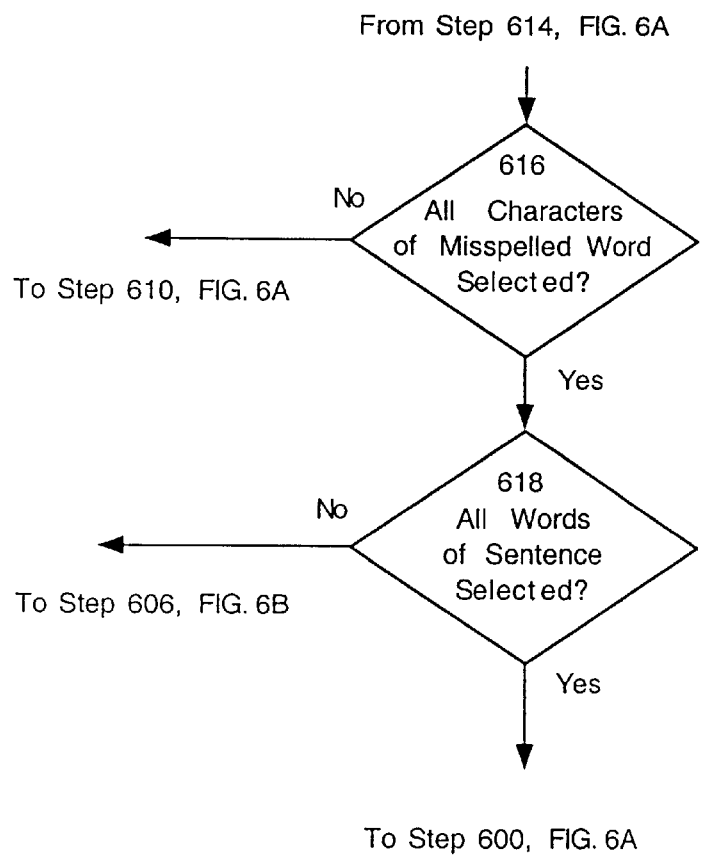

In another embodiment, the input text is converted on a word by word basis rather than a sentence by sentence basis. This embodiment is particularly useful if the user creates sentences using two different character sets. For example, the user may create a sentence that uses primarily Latin characters, except for one word which uses Greek characters. This embodiment is similar to the one described above, except that once it has been determined that the sentence was entered using the incorrect keyboard mode, then a word is selected from the sentence and a determination is made as to whether the word is correctly spelled. If the word is correctly spelled then the word is left alone. If the word is incorrectly spelled, then the word is converted. In this embodiment, the software architecture of FIG. 2 includes a spell checking module (not shown). The steps for this embodiment are illustrated in FIGS. 6A and 6B.

In step 600, the text converter module monitors the word processing program to determine when the word processing program is idle. Once the word processing program is idle, then the method proceeds from step 600 to step 602. In step 602, text entered via the word processing program is reviewed to determine whether the text constitutes a sentence. Preferably, the text converter module looks for a newly entered sentence, as well as an existing sentence that has been edited by adding, deleting or replacing a character of the sentence. Alternatively, the text converter module could look for any change to a sentence, including a formatting change. To determine whether the text constitutes a sentence, the text converter module searches the text for a delimiter, such as a period or a question mark. If a delimiter is detected, then the determination in step 602 is that a sentence is detected and the Yes branch is followed to step 604. If a delimiter is not detected, then the determination in step 602 is that a sentence is not detected and the No branch is followed to step 600.

If a sentence is detected, then a determination is made as to whether the sentence was entered using the correct keyboard mode in step 604. The text control module utilizes the language detection module to determine whether the sentence was entered using the correct keyboard mode. The details of step 604 are the same as those of step 304 and are discussed above in connection with FIG. 4. If the sentence was entered using the correct keyboard mode, then the Yes branch is followed to step 600.

If the determination in step 604 is that the sentence was entered using an incorrect keyboard mode, then the No branch is followed to step 606. In step 606, a word is selected from the sentence. Once a word is selected, a determination is made as to whether the word is misspelled in step 608. In one implementation, spell checking is performed as the user enters text. In this implementation, spell checking of the selected word may have occurred prior to step 608. If so, then the determination as to whether the selected word is misspelled is made by checking the results of the previous spell check. If the spelling of the selected word has not been checked, then the spelling of the selected word is checked in step 608.

To perform spell checking on the text as it is entered, each character is associated with a language tag as it is entered. The spell checking module uses the language tag of the first character of the word to determine the language to use for spell checking. A language tag is assigned to a character based upon the active keyboard mode, the user defined language option, and the text preceding the text entry point or insertion point. For example, if the user begins entering text into an empty document, then the characters are tagged with the language that corresponds to the active keyboard mode. If the user selects a language using a language option of the word processing program, then the characters are tagged with the language that corresponds to the user's selection. If the user inserts new text into previously entered text and the language of the text preceding the insertion point is different than the language corresponding to the active keyboard mode, then the characters of the inserted text are tagged with the language that corresponds to the text preceding the insertion point. As will be apparent to those skilled in the art, a number of alternative spell checking methods are available to determine whether the word is misspelled.

If the determination in step 608 is that word is correctly spelled, then the word is not converted. The No branch is followed to step 606 and another word is selected from the sentence. If the determination in step 608 is that the word is misspelled, then the Yes branch is followed to step 610.

In step 610, a character is selected from the misspelled word. Once a character is selected from the misspelled word, then the alternative character is determined in step 612. Step 612 follows the steps described in connection with FIG. 4 to determine the alternative character. Once the alternative character is determined, the selected character is replaced by the alternative character in step 614. From step 614 of FIG. 6A the method proceeds to step 616 of FIG. 6B. In step 616, a determination is made as to whether all the characters of the misspelled word have been selected. If the determination in step 616 is that all the characters of the misspelled word have been selected, then the Yes branch is followed to step 618. If the determination in step 616 is that all of the characters of the misspelled word have not been selected, then the No branch is followed to step 610 of FIG. 6A. Steps 610, 612, and 614 are repeated until all of the characters of the misspelled word have been selected.

Once all the characters of the misspelled word have been selected, then a determination is made in step 618 as to whether all the words of the sentence have been selected. If all the words of the sentence have been selected, then the method proceeds to step 600 of FIG. 6A. Otherwise, the No branch is followed to step 606 of FIG. 6A and another word in the sentence is selected. Words are selected until all of the words of the sentence have been selected.

Exemplary Text Conversion

FIGS. 7A and 7B illustrate the conversion of text entered using the Greek keyboard mode to text corresponding to the Latin keyboard mode. FIG. 7A illustrates text entered using the Greek keyboard mode. The text shown in FIG. 7A is displayed to the user. Once the user has entered the text, then the method described in connection with FIGS. 3, 4 and 5 (or FIGS. 4, 5, 6A and 6B) is executed to convert the text. Once the conversion is complete, the text shown in FIG. 7B is displayed to the user.

Although the present invention has been described in connection with a keyboard implementing two keyboard modes, those skilled in the art will appreciate that the invention can also be used with a keyboard that implements three or more keyboard modes. If the invention is used in connection with more than two keyboard modes, then the alternative character is determined by sending the virtual key to the keyboard driver corresponding to the keyboard mode identified by the language ID information as the keyboard mode that should have been used to enter the text.

In summary, the present invention directed toward a method for converting text entered using one keyboard mode to text corresponding to a different keyboard mode. The method uses language detection to determine whether the text was entered using the correct keyboard mode. If the text was entered using an incorrect keyboard mode, then the text is converted to text that corresponds to the correct keyboard mode. The incorrect text is converted on a character by character basis to the correct text by mapping each incorrect character to a virtual key and then mapping the virtual key to the correct character.

Alternative embodiments will be apparent to those skilled in the art to which the present invention pertains without departing from its spirit and scope. Accordingly, the scope of the present invention is described by the appending claims and is supported by the foregoing description.

What is claimed is:

1. A method for automatically converting text from a first set of characters corresponding to a first language entered using a first keyboard mode to an alternative set of characters corresponding to a second keyboard mode and an alternative language, comprising the steps of:

determining what language the first set of characters represents;

if the first set of characters represents the alternative language, then for each one of the first set of characters, selecting one of the characters as a selected character;

determining whether the selected character could be mapped into a virtual key;

if the selected character could be mapped into a virtual key, then performing the steps of:

determining a selected virtual key that corresponds to the selected character;

determining selected keyboard state information that corresponds to the selected character; and determining the alternative selected character that corresponds to the selected virtual key and the selected keyboard state information; and replacing the selected character with the alternative selected character; and if the selected character could not be mapped to a virtual key, then performing the steps of:

determining whether the selected character could be mapped to an alternative character using an exception table; and replacing the selected character with the alternative character if the selected character could be mapped using the exception table.

2. The method of claim 1, wherein the step of determining a selected virtual key that corresponds to the selected character comprises the step of:

requesting that a first keyboard driver corresponding to the first keyboard mode map the selected character to the selected virtual key and determine the selected keyboard state information.

3. The method of claim 1, wherein the step of determining the alternative selected character that corresponds to the selected virtual key comprises the step of:

requesting that a second keyboard driver corresponding to the second keyboard mode map the selected virtual key and the selected keyboard state information to the alternative selected character.

4. The method of claim 1, wherein the step of determining what language the first set of characters represents, comprises the steps of:

sending the first set of characters to a language detection module;

receiving from the language detection module a first language identifier that identifies what keyboard mode was used to enter the first set of characters and a second language identifier that identifies what keyboard mode should have been used to enter the first set of characters;

comparing the first language identifier and the second language identifier; and if the first language identifier identifies the first keyboard mode and the second language identifier identifies the second keyboard mode, then determining that the first set of characters represents the alternative language.

5. The method of claim 4, wherein a first language corresponds to the first keyboard mode, and wherein the step of determining what language the first set of characters represents further comprises the step of:

if the first language identifier identifies the first keyboard mode and the second language identifier identifies the first keyboard mode, then determining that the first set of characters represents the first language.

6. The method of claim 1, wherein the first set of characters is a sentence.

7. The method of claim 1, wherein the first set of characters comprises a word.

8. In a computer system having a keyboard with a first keyboard mode that supports a first language and a second keyboard mode that supports a second language, a method for automatically converting a first word in a sentence entered using the first keyboard mode to a second word in the second language, comprising the steps of:

(a) determining whether the sentence is primarily in the first language or the second language;

(b) if the sentence is primarily in the second language, then selecting the first word;

(c) determining whether the first word is misspelled;

(d) if the first word is misspelled, then selecting a character from the first word;

(e) determining whether the selected character can be mapped to a virtual key;

(f) if the selected character can be mapped to a virtual key, performing the sequence, comprising the steps of:

(1) converting the selected character to a virtual key; and (2) converting the virtual key to a second character in the second language;

(g) if the selected character cannot be mapped to a virtual key, determining whether the selected character can be mapped to an exception table; and (h) if the selected character can be mapped to the exception table, replacing the selected character with an alternative character using the exception table; and (i) repeating steps (d)–(h) until the first word is converted into the second word.

9. The method of claim 8, wherein step (a) comprises the steps of:

sending the sentence to a language detection module;

receiving from the language detection module a first language identifier that identifies what keyboard mode was used to enter the sentence and a second language identifier that identifies what keyboard mode should have been used to enter the sentence;

comparing the first language identifier and the second language identifier; and if the first language identifier identifies the first keyboard mode and the second language identifier identifies the second keyboard mode, then determining that the sentence is primarily in the second language.

10. The method of claim 9, wherein step (a) further comprises the step of:

if the first language identifier and the second language identifier identify the first keyboard mode, then determining that the sentence is primarily in the first language.

11. The method of claim 9, further comprising the steps of:

if the first word is not misspelled, then selecting another word from the sentence; and repeating steps (c)–(i) for the other word.

12. The method of claim 9, further comprising the step of:

repeating steps (c)–(j) for the remaining words of the sentence.

13. The method of claim 8, wherein a first keyboard driver module corresponds to the first keyboard mode, and wherein step (e) comprises the steps of:

sending the selected character to the first keyboard driver module; and receiving the virtual key and keyboard state information from the first keyboard driver module.

14. The method of claim 13, wherein a second keyboard driver module corresponds to the second keyboard mode, and wherein step (f)(2) comprises the steps of:

sending the virtual key and the keyboard state information to the second keyboard driver module; and receiving the converted character from the second keyboard driver module.

15. A method for automatically converting a first set of characters entered using a first keyboard mode corresponding to a first keyboard driver module and a first language to a second set of characters corresponding to a second keyboard mode, the second keyboard mode corresponding to a second keyboard driver module and a second language, comprising the steps of:

determining whether the first set of characters corresponds to the first language or to the second language;

if the first set of characters corresponds to the second language, then converting the first set of characters to the second set of characters by:

(a) selecting one of the characters of the first set of characters as a selected character;
(b) determining a second selected character by
  (i) sending the selected character to the first keyboard driver module;
  (ii) if the first keyboard driver module returns a virtual key, then performing steps of:
    (A) sending the virtual key to the second keyboard driver module;
    (B) receiving the second selected character from the second keyboard driver module; and
    (C) replacing the first selected character with the second selected character; and
  (iii) if the first keyboard module does not return a virtual key, performing the steps of:
    (A) determining whether the first selected character is contained in an exception table; and
    (B) if the first selected character is contained the exception table, mapping the first selected character to the second selected character; and
(c) repeating steps (a)–(b) for each of the remaining characters of the first set of characters.

16. The method of claim 15, wherein the step of determining whether the first set of characters corresponds to the first language or to the second language comprises the steps of:

using a language detection module to generate a first language identifier and a second language identifier, the first language identifier identifying what keyboard mode was used to enter the first set of characters and the second language identifier identifying what keyboard mode should have been used to enter the first set of characters;

comparing the first language identifier and the second language identifier;

if the first language identifier and the second language identifier identify the first keyboard mode, then determining that the first set of characters corresponds to the first language; and if the first language identifier identifies the first keyboard mode and the second language identifier identifies the second keyboard mode, then determining that the first set of characters corresponds to the second language.

17. The method of claim 15, wherein the first language is Greek and the second language is English.

18. The method of claim 15, wherein the first language is English and the second language is Cyrillic.

* * * * *